(12) United States Patent
Katano

(10) Patent No.: US 9,316,807 B2
(45) Date of Patent: Apr. 19, 2016

(54) LENS BARREL AND IMAGE PICKUP APPARATUS

(71) Applicant: CANON KABUSHIKI KAISHA, Tokyo (JP)

(72) Inventor: Kenichi Katano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/553,277

(22) Filed: Nov. 25, 2014

(65) Prior Publication Data

US 2015/0153538 A1    Jun. 4, 2015

(30) Foreign Application Priority Data

Nov. 29, 2013  (JP) ................................. 2013-247829

(51) Int. Cl.
*H04N 5/225* (2006.01)
*G02B 7/04* (2006.01)
*H04N 1/00* (2006.01)

(52) U.S. Cl.
CPC .............. *G02B 7/04* (2013.01); *H04N 1/00519* (2013.01); *H04N 5/2254* (2013.01); *H04N 2201/02418* (2013.01)

(58) Field of Classification Search
CPC .................. H04N 5/2252; H04N 2201/02483; H04N 1/00519; H04N 5/225; H04N 5/2254; H04N 2201/02418; H04N 2201/02458; H04N 5/238
USPC ...................... 348/208.11, 335, 363, 373, 374
See application file for complete search history.

(56) References Cited

U.S. PATENT DOCUMENTS

| 2009/0268320 | A1* | 10/2009 | Uehara | G03B 11/043 359/826 |
| 2010/0183291 | A1* | 7/2010 | Kudoh | G03B 17/04 396/448 |
| 2011/0157700 | A1* | 6/2011 | Torii | G03B 9/14 359/511 |
| 2012/0183286 | A1* | 7/2012 | Ishimasa | G03B 9/22 396/349 |
| 2013/0016961 | A1* | 1/2013 | Fukai | G03B 17/04 396/72 |

FOREIGN PATENT DOCUMENTS

JP       2012-150173 A       8/2012

* cited by examiner

*Primary Examiner* — Hung Lam
(74) *Attorney, Agent, or Firm* — Cowan, Liebowitz & Latman, P.C.

(57) ABSTRACT

A lens barrel includes a first blade member, a second blade member provided at an object side of the first blade member and overlapped with at least part of the first blade member in an optical axis direction, a drive unit configured to perform an opening and closing drive of the first blade member and the second blade member, and a biasing member configured to apply a biasing force to the drive unit, the biasing member is disposed in a direction orthogonal to an optical axis with respect to the first blade member, and the biasing member is disposed so as to overlap with at least part of the second blade member in the optical axis direction during an opening and closing operation of the second blade member.

10 Claims, 18 Drawing Sheets

LENS BARREL AND IMAGE PICKUP APPARATUS

BACKGROUND OF THE INVENTION

1. Field of the Invention

The present invention relates to a lens barrel, and more particularly to a lens barrel which includes a barrier cylinder protecting a lens.

2. Description of the Related Art

Previously, a lens barrel that extends from an image pickup apparatus body at the time of capturing an image and that retracts inside the body at the time of storage has been proposed. Such a lens barrel includes a retraction mechanism that is configured by a combination of a plurality of straight moving cylinders and rotational cylinders to extend and retract lens units in an optical axis direction. Furthermore, a lens barrier mechanism (barrier cylinder) that covers a front of a lens at a retracted position and that evacuates from the front of the lens when use, in conjunction with the retraction mechanism, has been proposed.

When for example a plurality of barrier blades are configured to overlap with each other in order to reduce the size of the lens barrel, it is necessary to have a certain space in the optical axis direction. In addition, when the length of a cam cylinder or a straight moving cylinder that moves in conjunction with the cam cylinder is increased in order to shorten the length of retraction, the cam cylinder and the straight moving cylinder are intruded into a space of a first cylinder that constitutes the barrier mechanism, and thus a space of parts that constitute the barrier mechanism is limited. Therefore, in order to reduce the size of the barrier mechanism and a barrel apparatus, it is required to efficiently dispose component parts of the barrier mechanism.

Japanese Patent Laid-open No. 2012-150173 discloses a barrel in which a plurality of barrier blades overlapping with each other are moved in conjunction with a bent portion from the barrier blade toward an imaging plane side and a locking portion using a thickness of the blade to achieve a thinned configuration.

In order to shorten the length of retraction of the lens barrel by reducing the size of the barrier mechanism, and particularly by thinning the size in the optical axis direction, the relation of the barrier blade and a spring that biases the barrier blade is important. It is because reducing (thinning) the size in the optical axis direction is inhibited if the barrier blade and the spring are disposed to be laminated along the optical axis direction.

SUMMARY OF THE INVENTION

The present invention provides a lens barrel and an image pickup apparatus including a small-sized barrier mechanism.

A lens barrel as one aspect of the present invention includes a first blade member, a second blade member provided at an object side of the first blade member and overlapped with at least part of the first blade member in an optical axis direction, a drive unit configured to perform an opening and closing drive of the first blade member and the second blade member, and a biasing member configured to apply a biasing force to the drive unit, the biasing member is disposed in a direction orthogonal to an optical axis with respect to the first blade member, and the biasing member is disposed so as to overlap with at least part of the second blade member in the optical axis direction during an opening and closing operation of the second blade member.

An image pickup apparatus as another aspect of the present invention includes the lens barrel.

Further features and aspects of the present invention will become apparent from the following description of exemplary embodiments with reference to the attached drawings.

DESCRIPTION OF THE EMBODIMENTS

Figure 1:
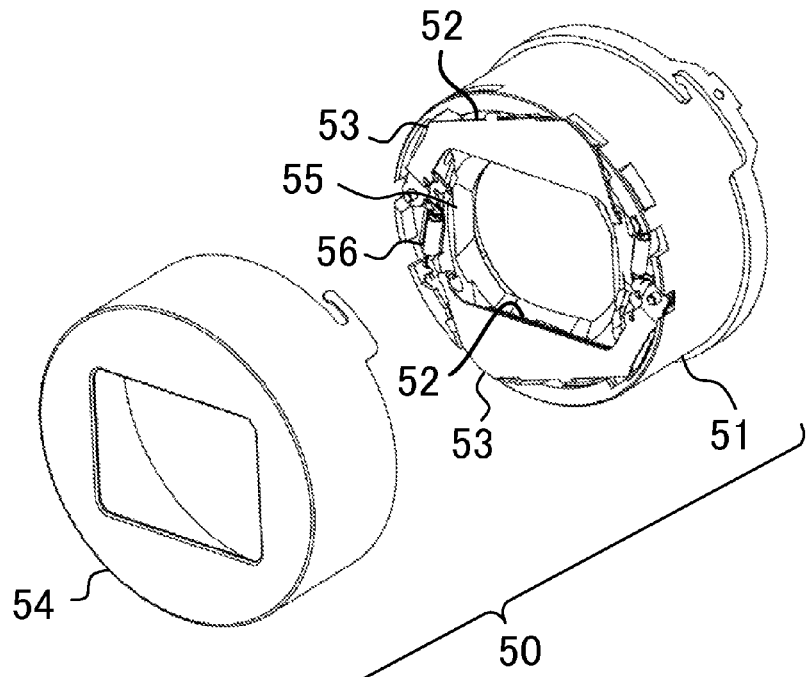
FIG. 1 is an exploded perspective view of a barrier apparatus (first cylinder unit) in the embodiment.

Exemplary embodiments of the present invention will be described below with reference to the accompanied drawings. In each of the drawings, the same elements will be denoted by the same reference numerals and the duplicate descriptions thereof will be omitted.

Figure 2:
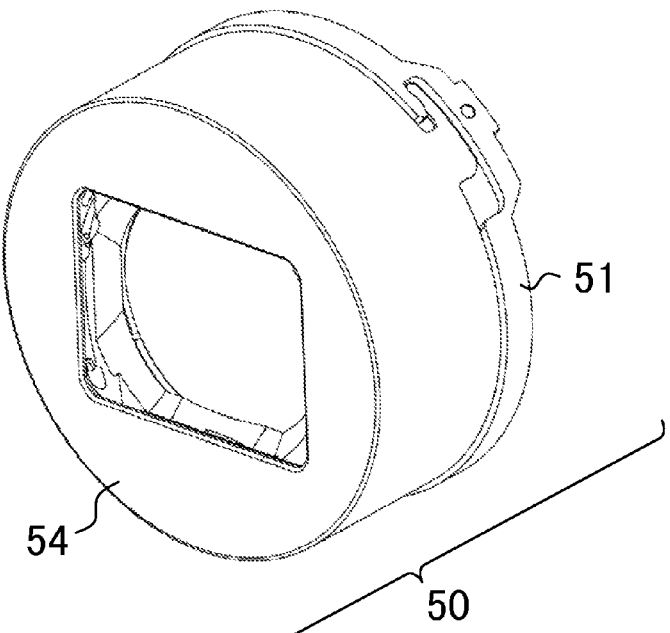
FIG. 2 is a perspective view of a lens barrel (first cylinder unit) in the embodiment.
Figure 3:
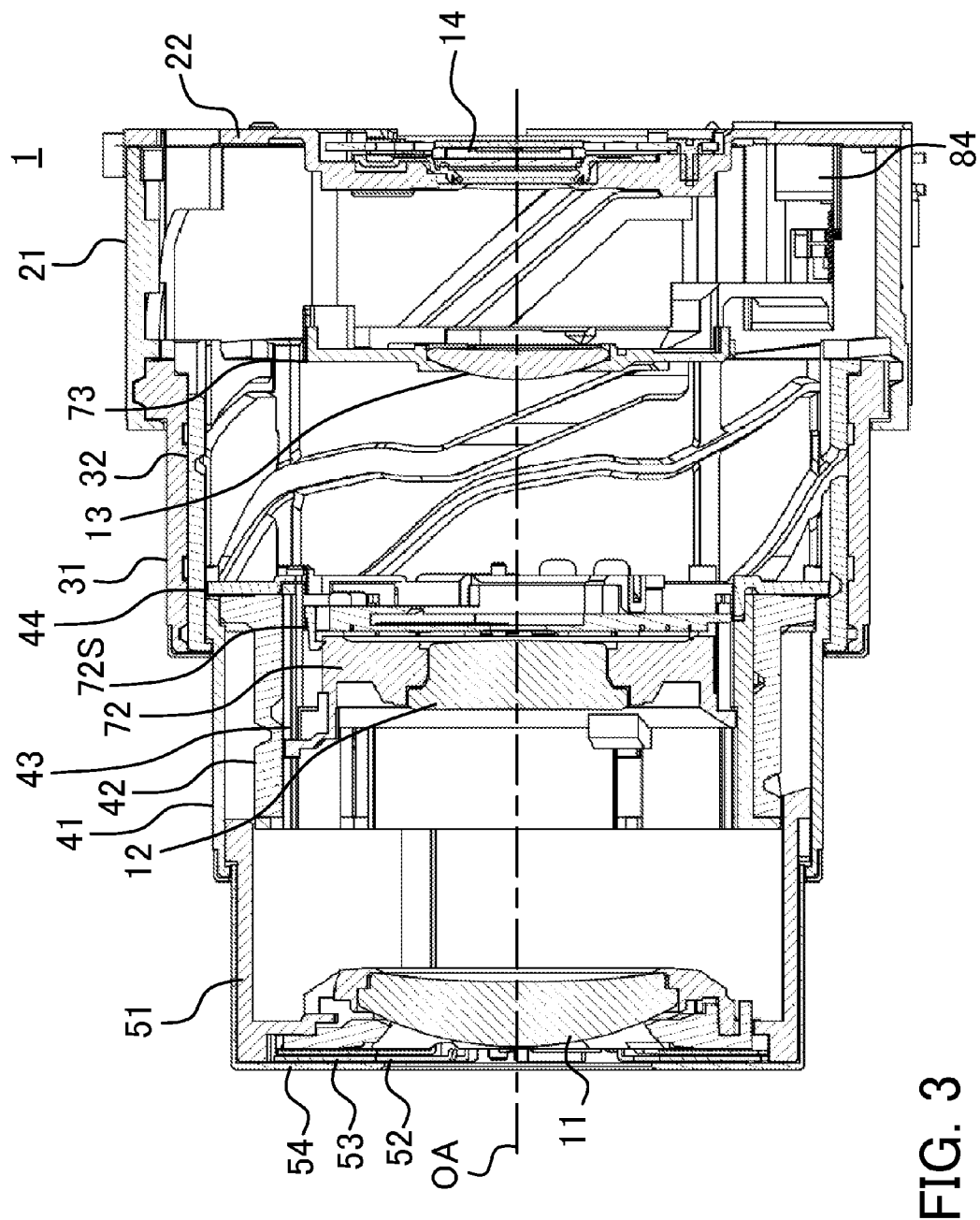
FIG. 3 is a cross-sectional view of the lens barrel (in an image capturing state) in the embodiment.
Figure 4:
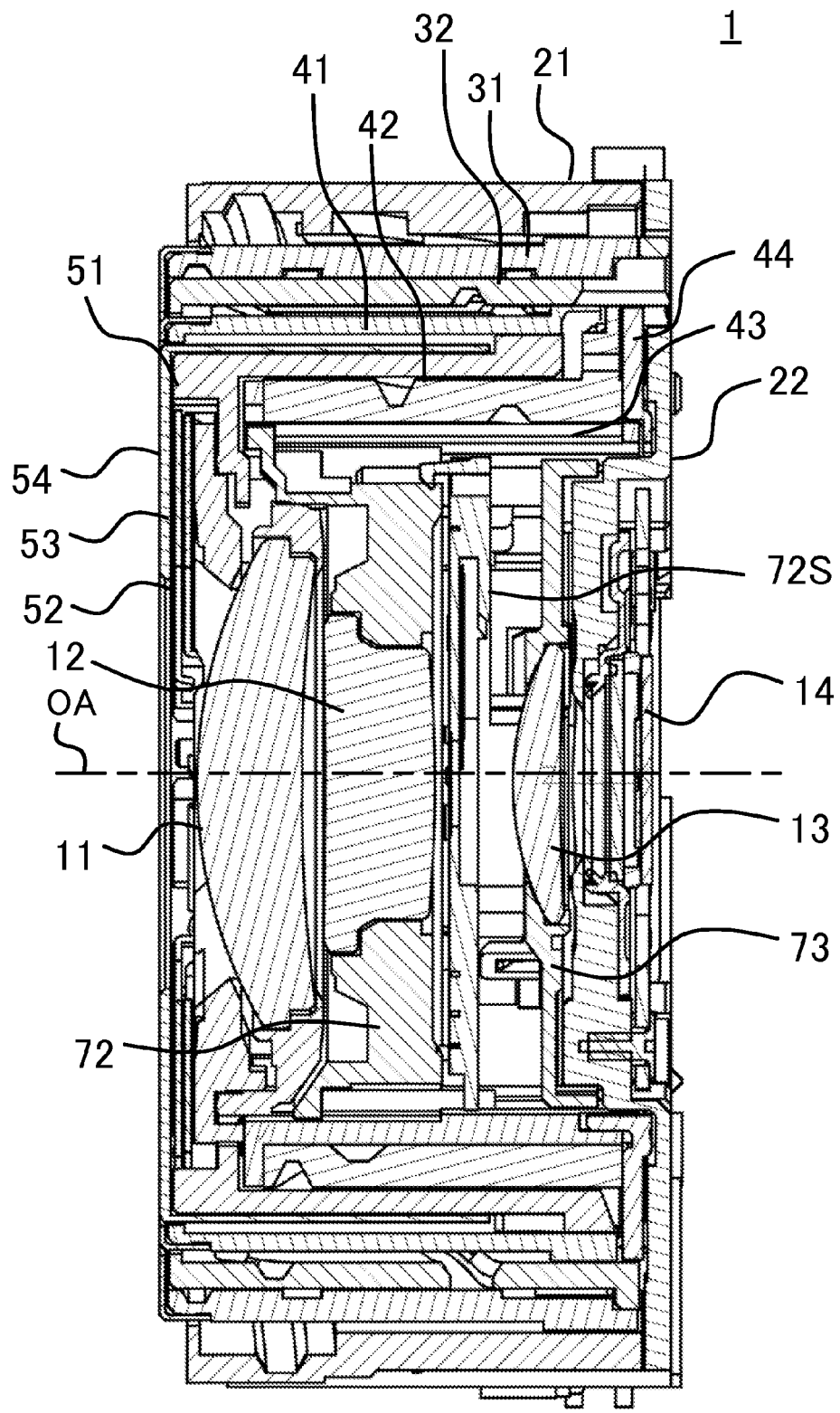
FIG. 4 is a cross-sectional view of the lens barrel (in a retracted state) in the embodiment.
Figure 5:
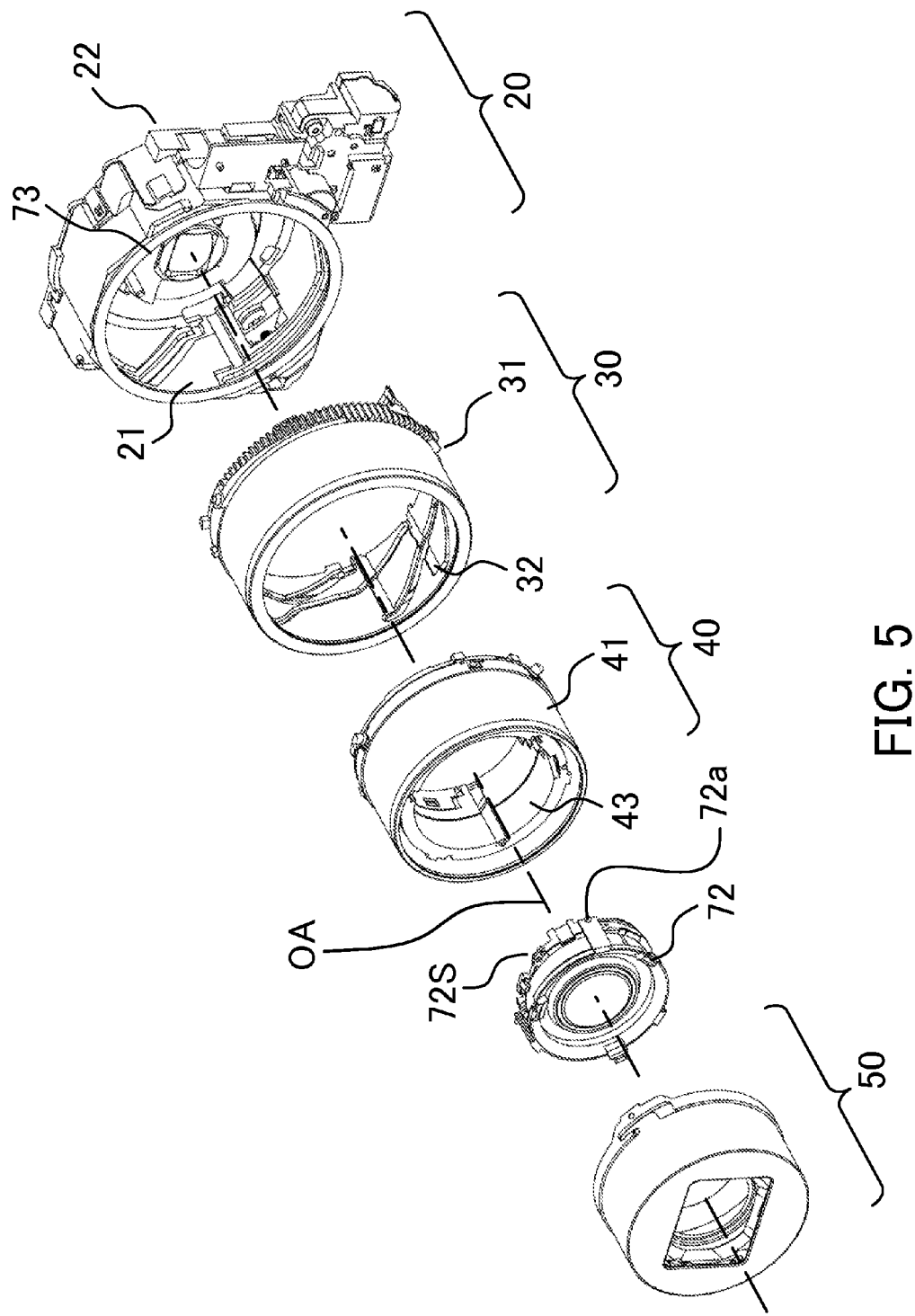
FIG. 5 is an exploded perspective view of the lens barrel in the embodiment.

First, referring to FIGS. 1 to 5, a lens barrel including a barrier apparatus in the embodiment will be described. FIG. 1 is an exploded perspective view of a first cylinder unit 50 that is provided in the lens barrel 1 in the embodiment. FIG. 2 is a perspective view of the first cylinder unit 50. FIGS. 3 and 4 are cross-sectional views of the lens barrel 1 including the barrier apparatus in the embodiment. FIG. 3 illustrates a case where the lens barrel 1 is in an image capturing state (extended state), and FIG. 4 illustrates a case where the lens barrel 1 is in a retracted state. FIG. 5 is an exploded perspective view of the lens barrel 1.

As illustrated in FIGS. 3 and 4, the lens barrel 1 of the embodiment is configured by three lens units (image pickup lens units) including a first lens unit 11, a second lens unit 12, and a third lens unit 13. The first lens unit 11 is held on a first cylinder 51 (holding member). The second lens unit 12 is held on a second unit holder 72. The second unit holder 72 is provided with a shutter unit 72S. The third lens unit 13 is held on a third unit holder 73. Power is supplied from an AF motor unit 84 to the third unit holder 73, and thus the third unit holder 73 is configured to be movable in a direction of an optical axis OA (optical axis direction). As illustrated in FIGS. 3 and 4, the lens barrel 1 of the embodiment has a three-stage retracting configuration, and can change a total length of the barrel between in the image capturing state and in the retracted state. As illustrated in FIG. 5, the lens barrel 1, in order from an imaging plane side to an object side, includes a fixed cylinder unit 20, a first cam cylinder unit 30, a second cam cylinder unit 40, and a first cylinder unit 50.

The lens barrel 1 is provided with the first cylinder unit 50 that includes a barrier apparatus (barrier mechanism). As illustrated in FIG. 2, the first cylinder unit 50 includes a first cylinder 51 and a first cap 54. As illustrated in FIG. 1, the first cylinder 51 is provided with barrier blades 52 (first blade member), barrier blades 53 (second blade member), a barrier drive ring 55 (drive unit), and a spring 56 (biasing member).

Subsequently, referring to FIGS. 6 to 8, the configuration of each stages (the fixed cylinder unit 20, the first cam cylinder unit 30, and the second cam cylinder unit 40) of the lens barrel 1 will be described.

Figure 6:
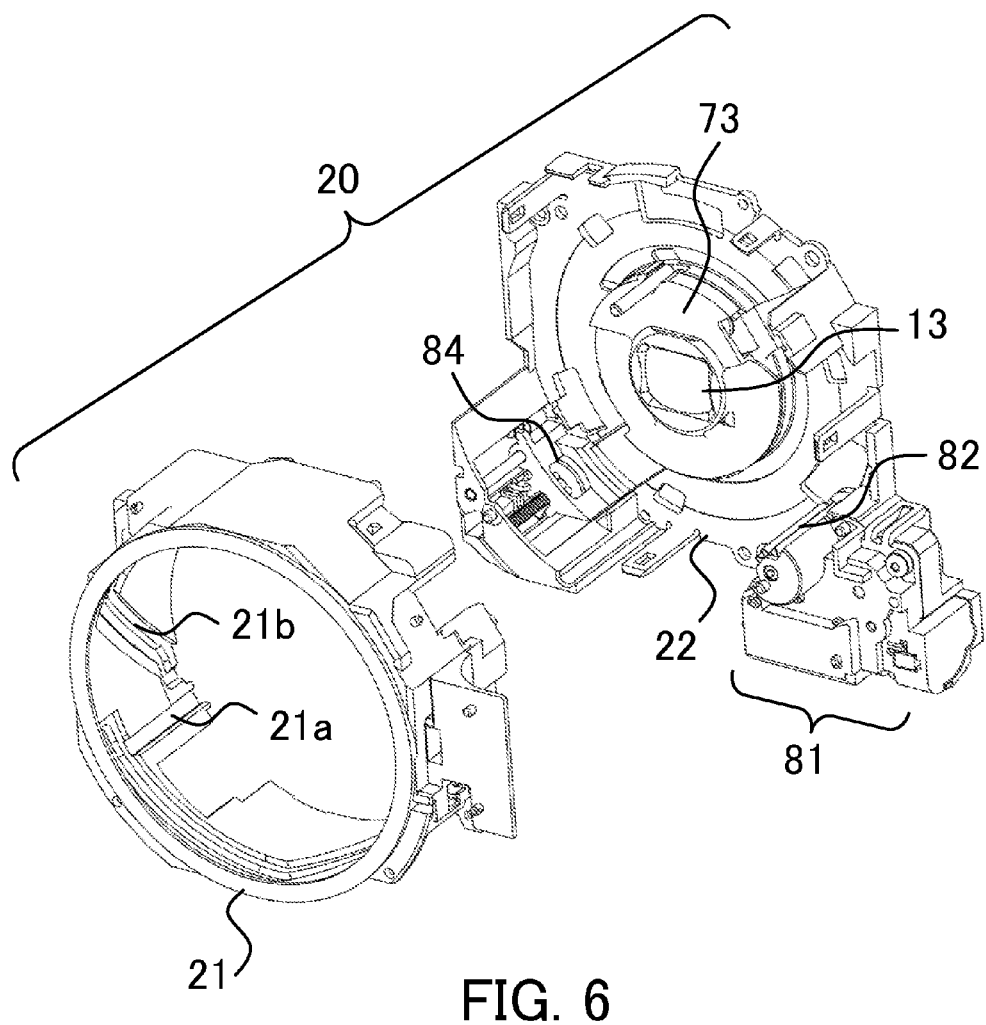
FIG. 6 is an exploded perspective view of the lens barrel (fixed cylinder unit) in the embodiment.

FIG. 6 is an exploded perspective view of the fixed cylinder unit 20. The fixed cylinder unit 20 includes a fixed cylinder 21 and a sensor holder 22. The fixed cylinder 21, on its inside, includes a straight groove 21a and a cam groove 21b. The sensor holder 22 holds an image pickup element 14. The sensor holder 22 includes a gear box 81 that stores a motor as a zoom drive source and a gear that transmits power from the motor. In a state where the fixed cylinder 21 is coupled to the sensor holder 22, the gear inside the gear box 81 engages with an output gear 82 to transmit the power to a first cam cylinder 31 described below. Furthermore, the sensor holder 22 includes an AF motor unit 84 that drives the third unit holder 73.

Figure 7:
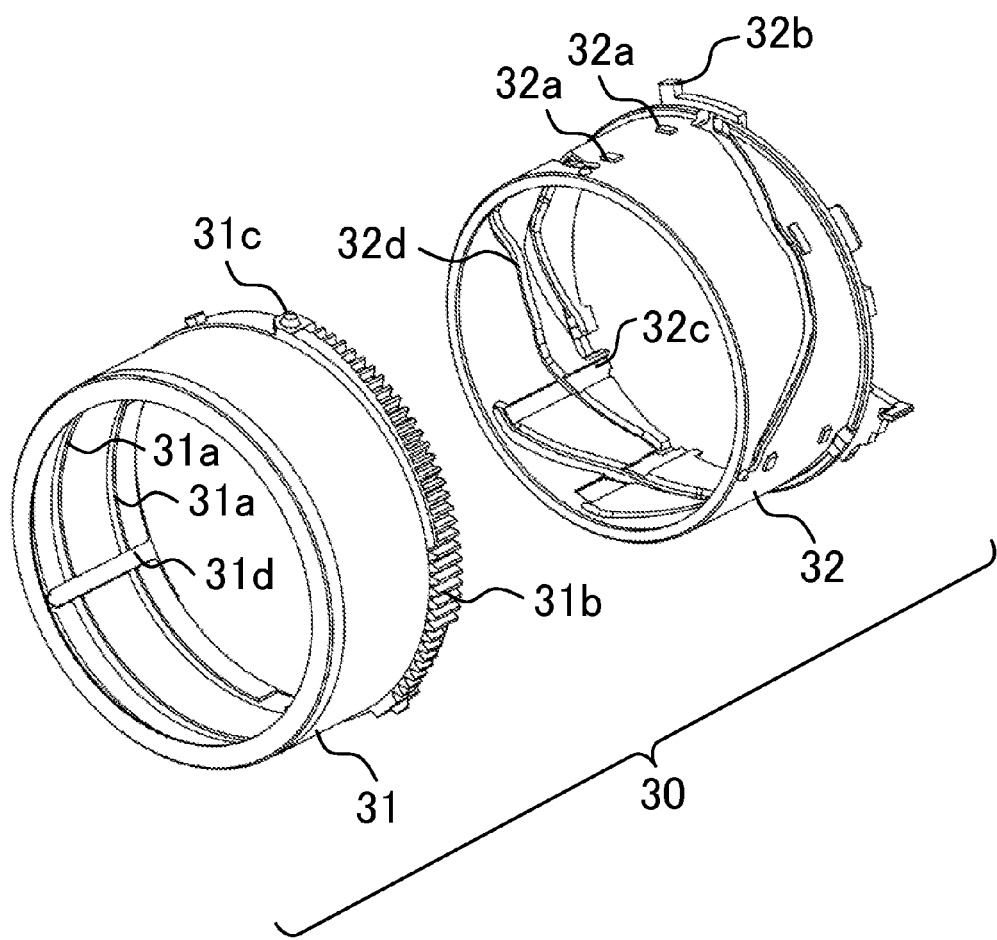
FIG. 7 is an exploded perspective view of the lens barrel (first cam cylinder unit) in the embodiment.

FIG. 7 is an exploded perspective view of the first cam cylinder unit 30. The first cam cylinder unit 30 is provided at a first stage of the lens barrel 1, and includes the first cam cylinder 31 and a first straight moving cylinder 32. The first cam cylinder 31 is, on its inside, provided with a groove 31a that is uniformly notched in a direction orthogonal to the optical axis (orthogonal direction of the optical axis) and a straight groove 31d. Furthermore, the first cam cylinder 31 is, on its inside, provided with a gear 31b that engages with the output gear 82 and a cam pin 31c. The cam pin 31c engages with the cam groove 21b of the fixed cylinder 21. Therefore, the first cam cylinder unit 30 is movable in the optical axis direction along a locus of the cam groove 21b.

The first straight moving cylinder 32 is provided with engaging portions 32a at three regions. The engaging portion 32a engages with the groove 31a of the first cam cylinder 31 that is uniformly notched in the direction orthogonal to the optical axis. In this configuration, the first straight moving cylinder 32 is movable integrally with the first cam cylinder 31 in the optical axis direction. The first straight moving cylinder 32 includes a straight moving key 32b provided on its outer surface, and a straight groove 32c and a cam groove 32d provided on its inner surface. The straight moving key 32b engages with the straight groove 21a of the fixed cylinder 21. Thus, the first straight moving cylinder 32 is guided to be moved straight.

Figure 8:
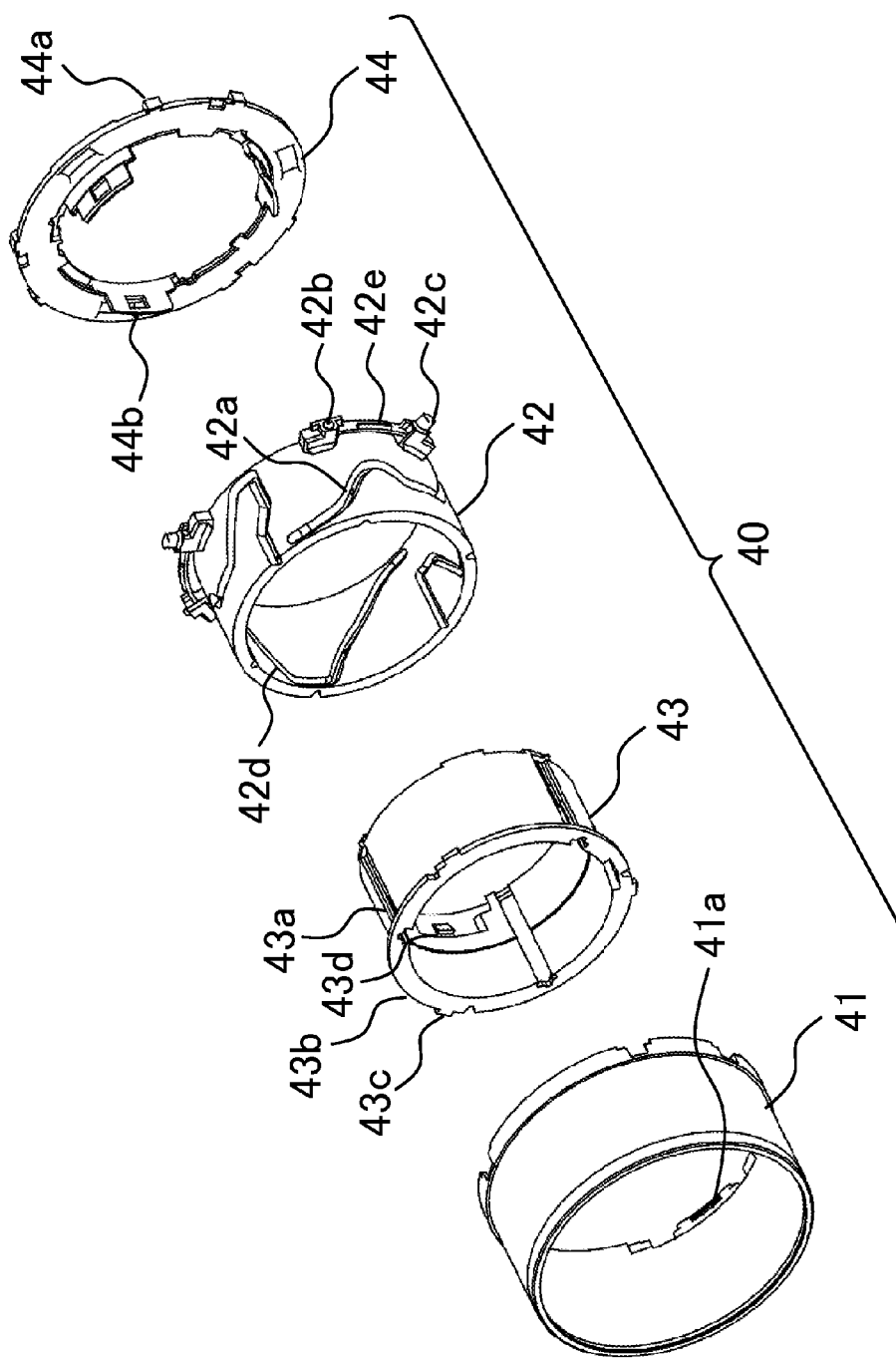
FIG. 8 is an exploded perspective view of the lens barrel (second cam cylinder unit) in the embodiment.

FIG. 8 is an exploded perspective view of the second cam cylinder unit 40. The second cam cylinder unit 40 is provided at the second stage of the lens barrel 1, and includes a cover cylinder 41, a second cam cylinder 42, a second straight moving cylinder 43, and a straight moving plate 44. The cover cylinder 41 includes engaging portions 41a arranged equally at three regions in its inside. The engaging portion 41a engages with an engaging portion 42e of the second cam cylinder 42, and the cover cylinder 41 is held on the second cam cylinder 42.

The second cam cylinder 42 includes a cam groove 42a, a cam pin 42b, and a rotation transmitting protrusion 42c, each of which is arranged equally at three regions on its outside. Furthermore, the second cam cylinder 42 includes cam grooves 42d arranged equally at three regions on its inside. The cam groove 42a engages with the cam pin 51a of the first cylinder 51. Therefore, the first cylinder 51 is extendable and retractable along a locus of the cam groove 42a. The rotation transmitting protrusion 42c engages with the straight groove 31d of the first cam cylinder 31. Therefore, the second cam cylinder 42 is rotatable along with the first cam cylinder 31. The cam groove 42d engages with a cam pin 72a of the second unit holder 72. Therefore, the second lens unit 12 is extendable and retractable along a locus of the cam groove 42d.

The second straight moving cylinder 43 (straight moving member) includes a straight guide groove 43a that guides the second unit holder 72 to be moved straight. Furthermore, the second straight moving cylinder 43, on an outer portion of a flange 43b, includes a straight moving key 43c that engages with a straight groove 51j (see FIG. 13) of the first cylinder 51 to perform the straight moving guide. In addition, the second straight moving cylinder 43 is provided with a protrusion 43d on its inner portion. The protrusion 43d engages with an engaging portion 44b of the straight moving plate 44. As described above, the second straight moving cylinder 43 is coupled to the straight moving plate 44 to hold the cam cylinder 42 between them. As a result, the second straight moving cylinder 43 is movable integrally with the second cam cylinder 42 in the optical axis direction. The straight moving plate 44 includes an engaging portion 44a that engages with the straight groove 32c of the first straight moving cylinder 32. The straight groove 32c of the first straight moving cylinder 32 engages with the engaging portion 44a (straight moving engaging portion) of the straight moving plate 44. In this configuration, the straight moving plate 44 and the second straight moving cylinder 43 coupled to it are guided to be moved straight.

Figure 9:
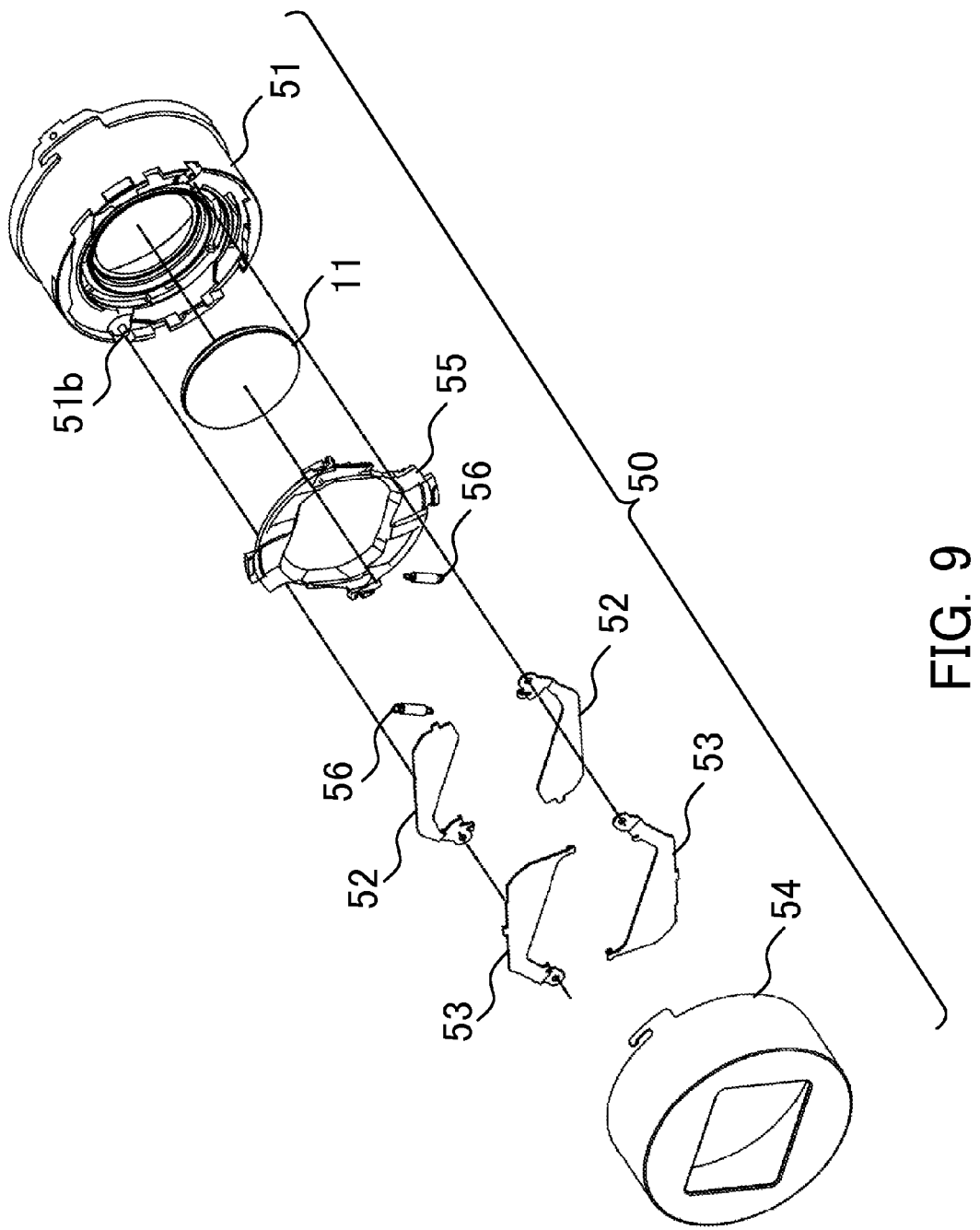
FIG. 9 is an exploded perspective view of the lens barrel (first cylinder unit) in the embodiment.

Subsequently, referring to FIG. 9, the first cylinder unit 50 (barrier mechanism) will be described in detail. FIG. 9 is an exploded perspective view of the first cylinder unit 50. The first cylinder unit 50 includes the first cylinder 51, two pairs of barrier blades 52 and 53, the first cap 54, the barrier drive ring 55, and the spring 56.

The barrier blades 52 and 53 are provided so as to overlap with each other in the optical axis direction. The barrier blade 52 is a first blade member that is provided at a side close to the first lens unit 11 (at an imaging plane side). The barrier blade 53 is a second blade member that is provided at a side far from the first lens unit 11 (at an object side). As described above, the barrier blade 53 is provided closer to the object side than the barrier blade 52, and is disposed so as to overlap with at least part of the barrier blade 52 in the optical axis direction. Each of the barrier blades 52 and 53 is fitted to a shaft 51b of the first cylinder 51. The barrier drive ring 55 is disposed closer to the imaging plane side (closer to the image pickup element 14) than the barrier blades 52 and 53, and is configured to be fitted to the first cylinder 51 to be rotatable around the optical axis. As described above, the barrier drive ring 55 is a drive unit that performs an opening and closing drive of the barrier blades 52 and 53.

The spring 56 is a biasing member that applies a biasing force to the barrier drive ring 55. In the embodiment, the spring 56 is provided between the barrier blade 52 and the barrier drive ring 55, and is configured to apply the biasing force to keep the barrier blade 52 in an open state. In other words, the spring 56 is hooked between the barrier blade 52 and the barrier drive ring 55. The biasing force of the spring 56 applies a rotational force (torque) to the barrier drive ring 55 such that the barrier blade 52 can keep the open state (a rotational force in a clockwise direction in FIG. 9). In the embodiment, the spring 56 is a coil spring, but the spring 56 is not limited to this. The first cap 54 is disposed at the object side of the barrier blades 52 and 53, and is configured to be engageable with the first cylinder 51.

Figure 16:
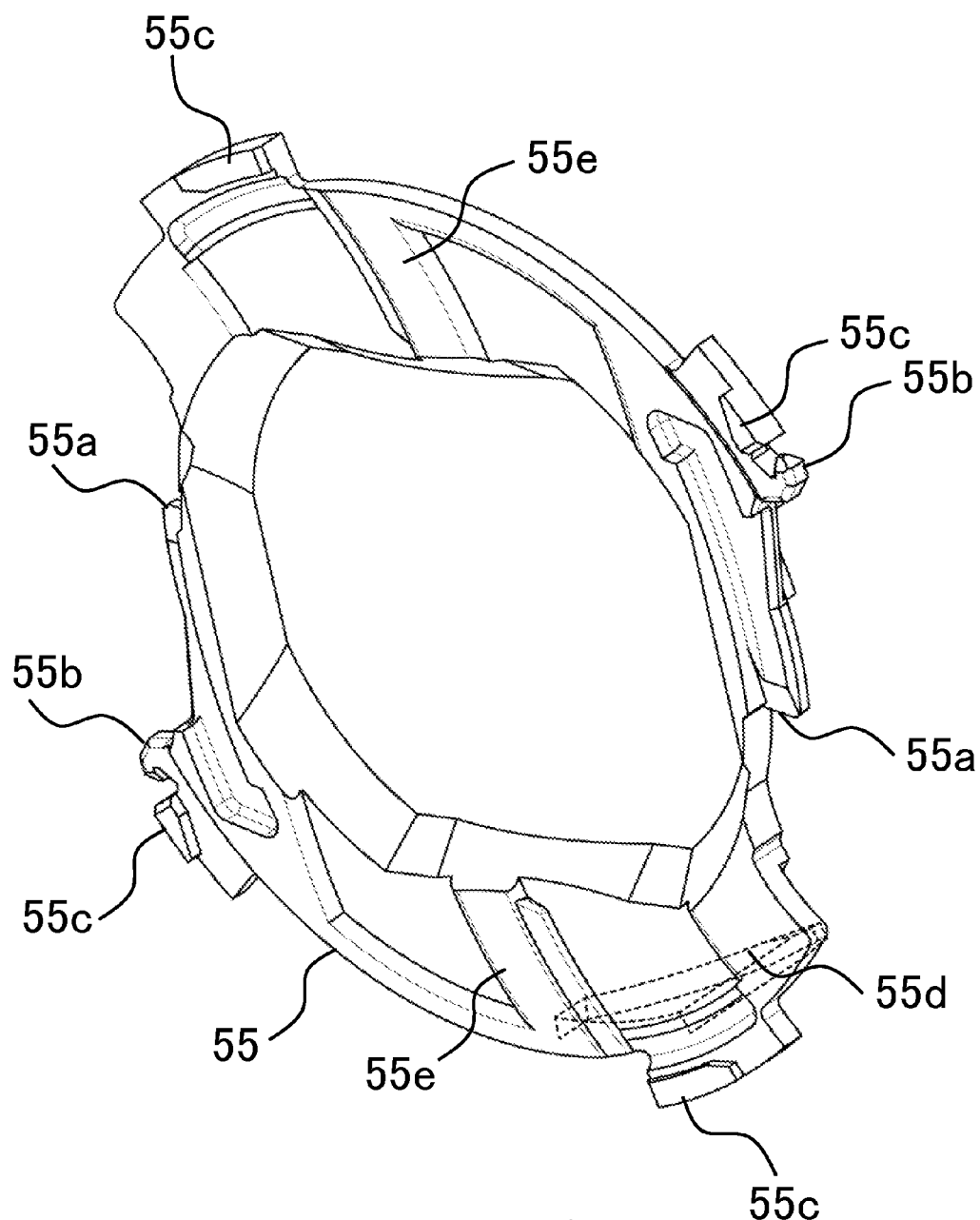
FIG. 16 is a perspective view of the barrier apparatus (barrier drive ring) in the embodiment.
Figure 17:
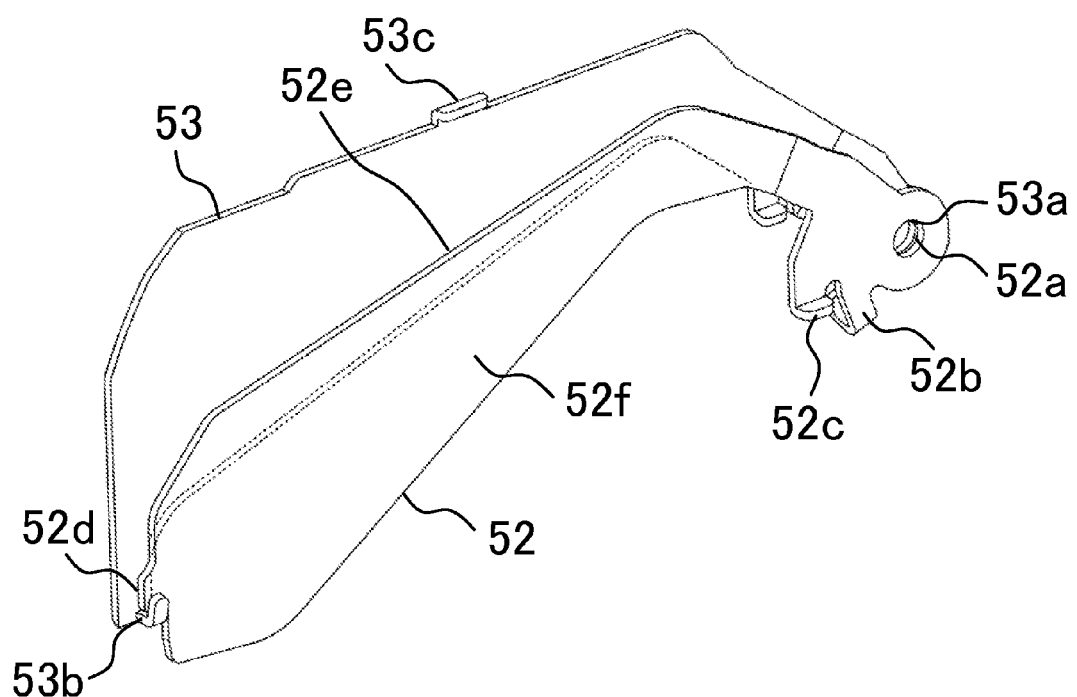
FIG. 17 is a perspective view of the barrier apparatus (barrier blade) in the embodiment.

Subsequently, referring to FIGS. 16 and 17, the configurations of the barrier drive ring 55 and the barrier blades 52 and 53 will be described in detail. FIG. 16 is a perspective view of the barrier drive ring 55 when viewed from the object side. FIG. 17 is a view of the barrier blades 52 and 53 when viewed from the imaging plane side.

As illustrated in FIG. 16, the barrier drive ring 55 includes blade drive portions 55a that press the engaging portions 52c of the barrier blades 52 and that are arranged symmetrically by 180 degrees, and spring hooks 55b that hold the springs 56. Furthermore, the barrier drive ring 55 includes convex portions 55c that are configured to perform the bayonet connections for bayonet portions 51c (position regulating member) of the first cylinder 51 to regulate a position in the optical axis direction. In addition, the barrier drive ring 55 includes a drive section 55d that engages with a slope portion 43e of the second straight moving cylinder 43, and convex-shaped slide portions 55e that slide on slide surfaces 52f of the barrier blades 52.

As illustrated in FIG. 17, the barrier blade 52 includes a fitting portion 52a that is fitted to the shaft 51b of the first cylinder 51, a spring hook 52b that holds the spring 56, an abutting portion 52c that abuts on the barrier drive ring 55, and a locking portion 52d that is provided at an end of the barrier blade 52. The barrier blade 53 includes a fitting portion 53a that is fitted to the shaft 51b of the first cylinder 51, and engaging portions 53b and 53c. The state illustrated in FIG. 17 is a closed state of the barrier blades 52 and 53, and the engaging portion 53b provided at an end of the barrier blade 53 engages with the locking portion 52d of the barrier blade 52 and thus the barrier blades 52 and 53 are in the closed state. When the barrier blades 52 and 53 are open, an end surface 52e that is an outline of the barrier blade 52 abuts on the engaging portion 53c that is provided at an outside end portion of a short side opening of the barrier blade 53 and the barrier blade 52 rotates the barrier blade 53 toward the open side. As a result, the barrier blades 52 and 53 are in an open state.

Figure 10:
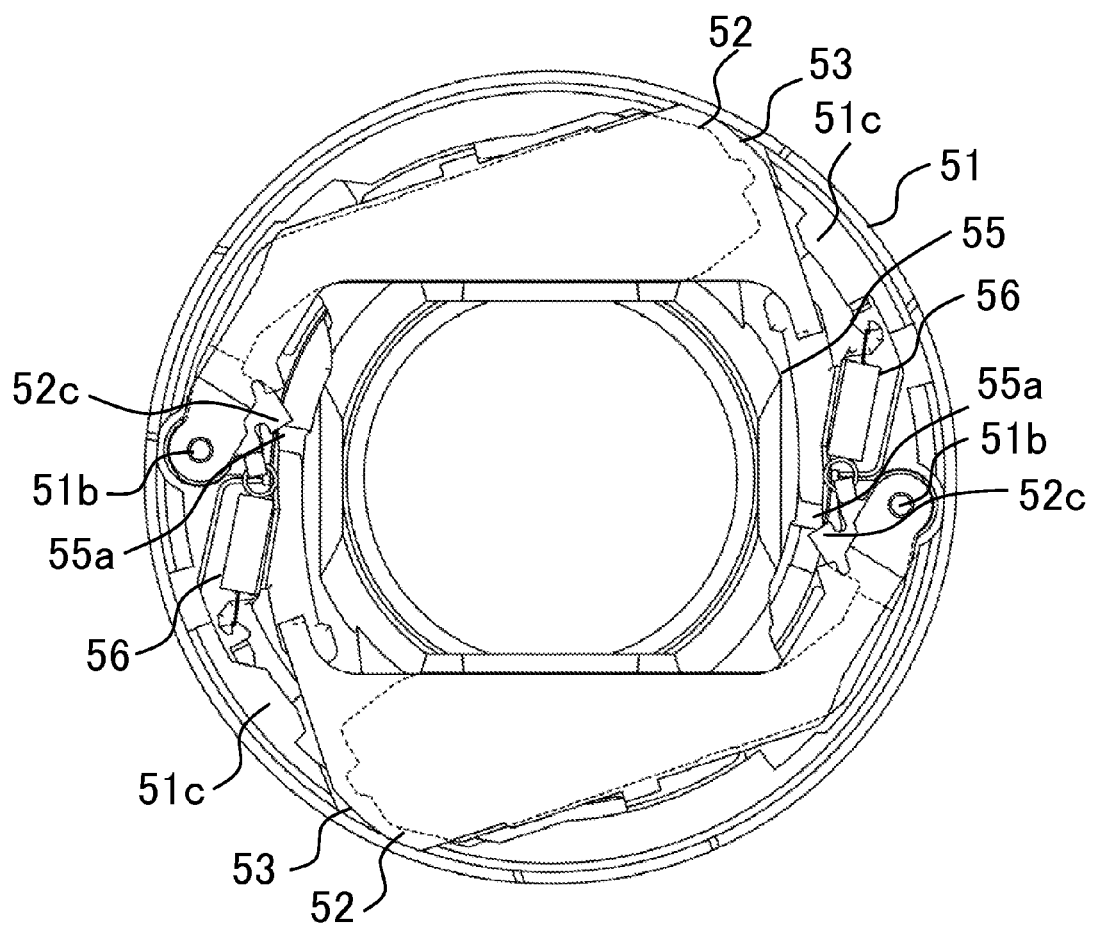
FIG. 10 is a front view of the barrier apparatus (first cylinder unit) in the embodiment.
Figure 11:
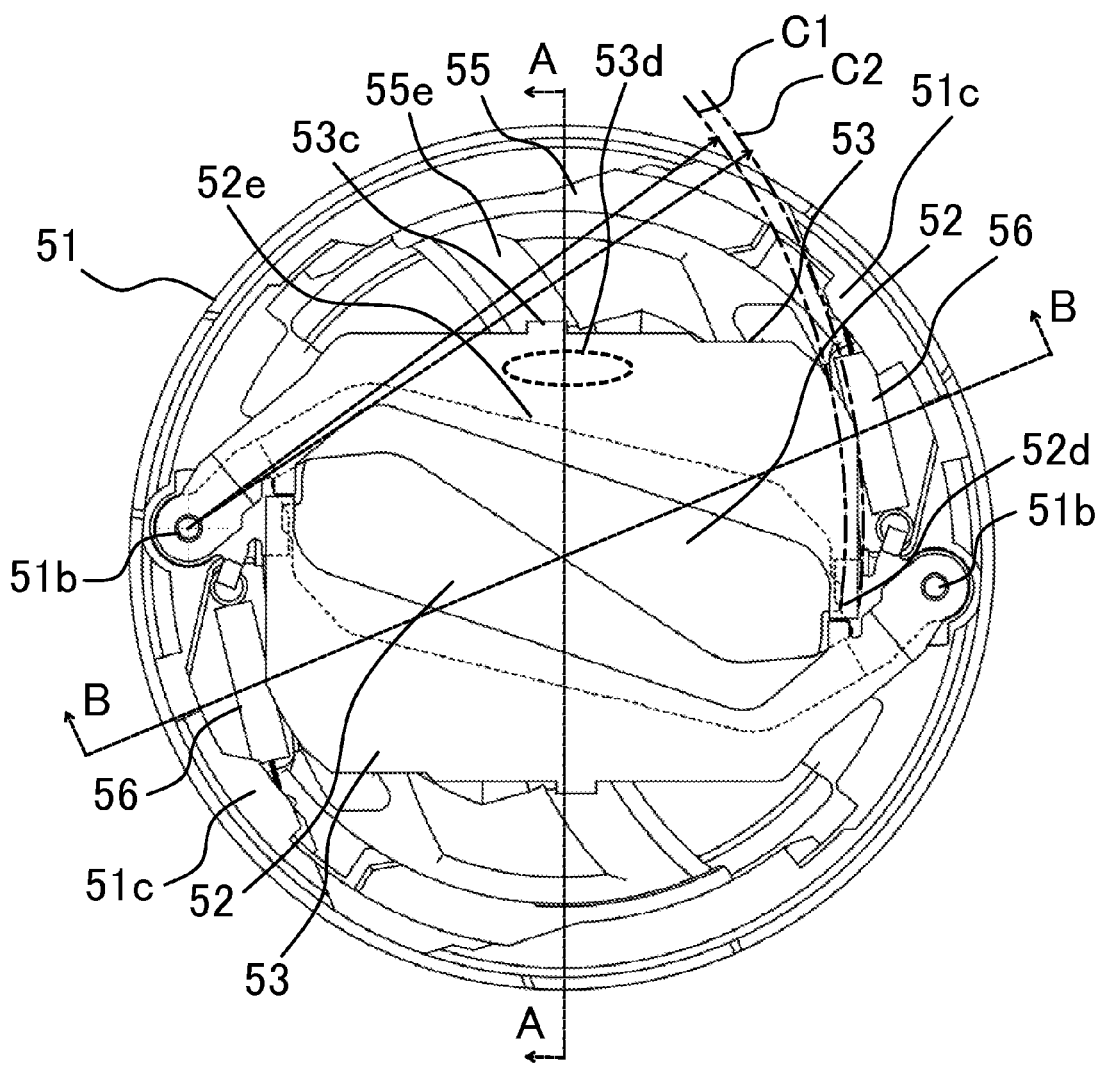
FIG. 11 is a front view of the barrier apparatus (first cylinder unit) in the embodiment.
Figure 12:
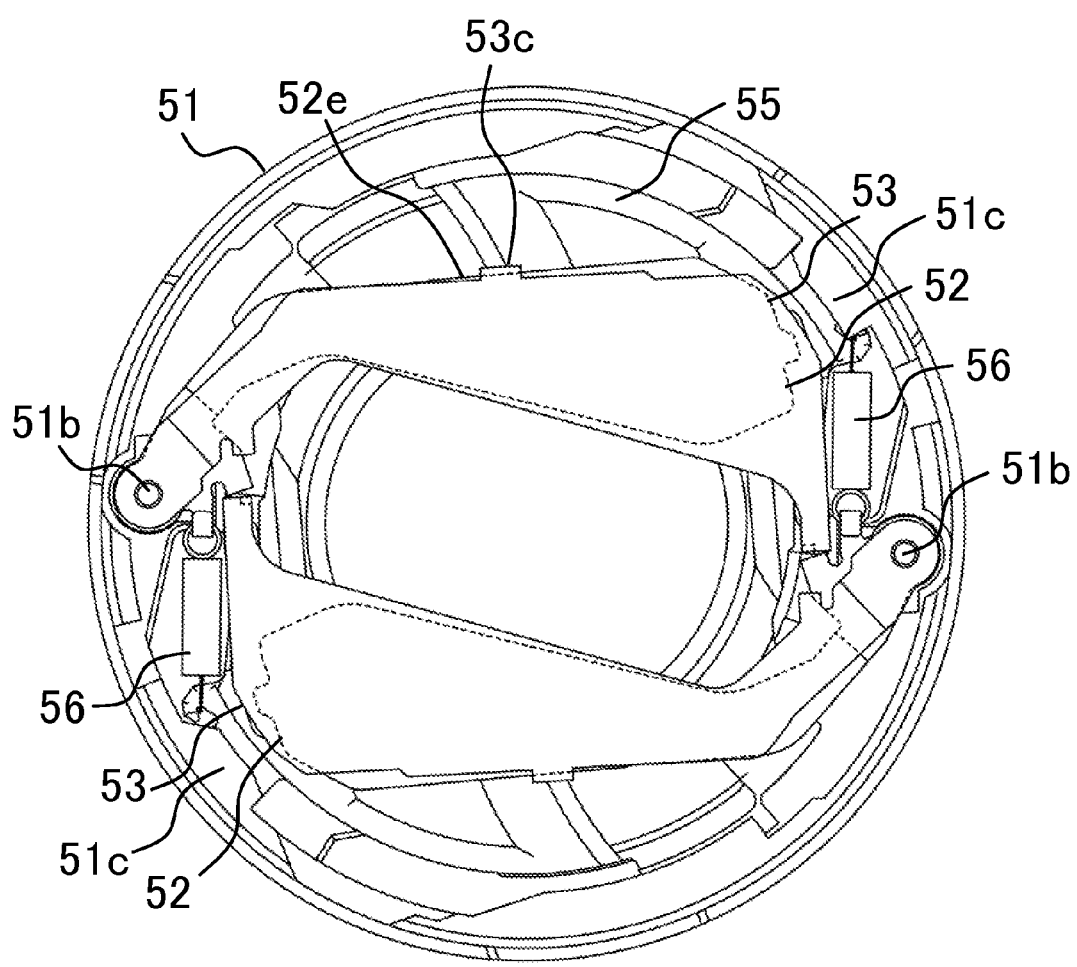
FIG. 12 is a front view of the barrier apparatus (first cylinder unit) in the embodiment.
Figure 13:
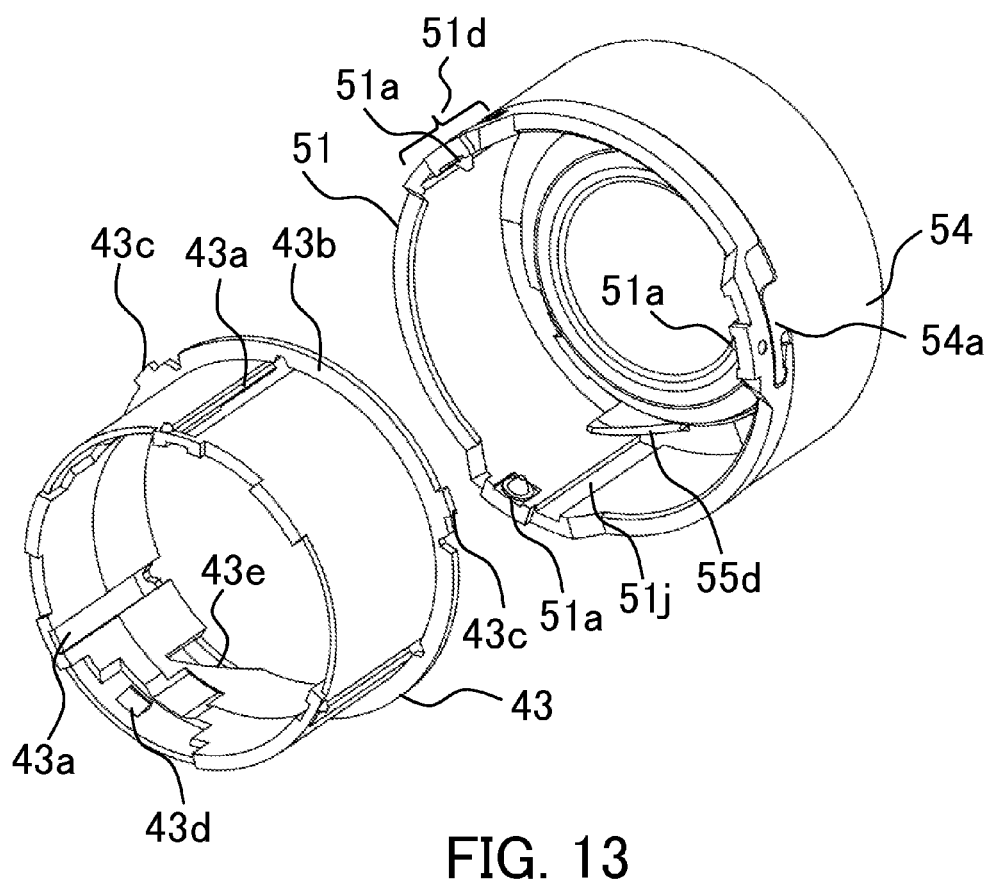
FIG. 13 is a perspective view of the lens apparatus (first cylinder unit and second straight moving cylinder) in the embodiment.
Figure 14:
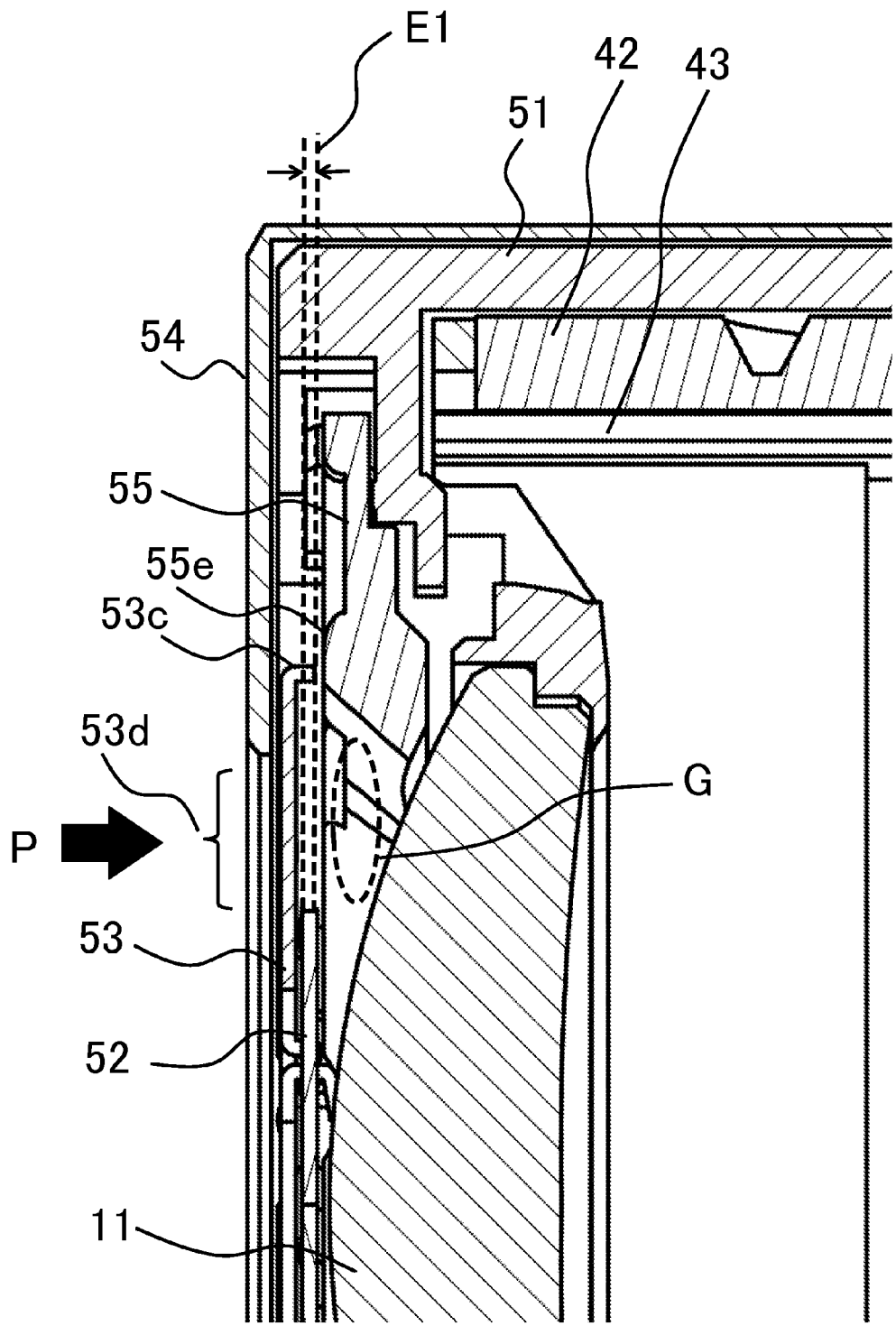
FIG. 14 is a cross-sectional view of the barrier apparatus (first cylinder unit) in the embodiment.
Figure 15:
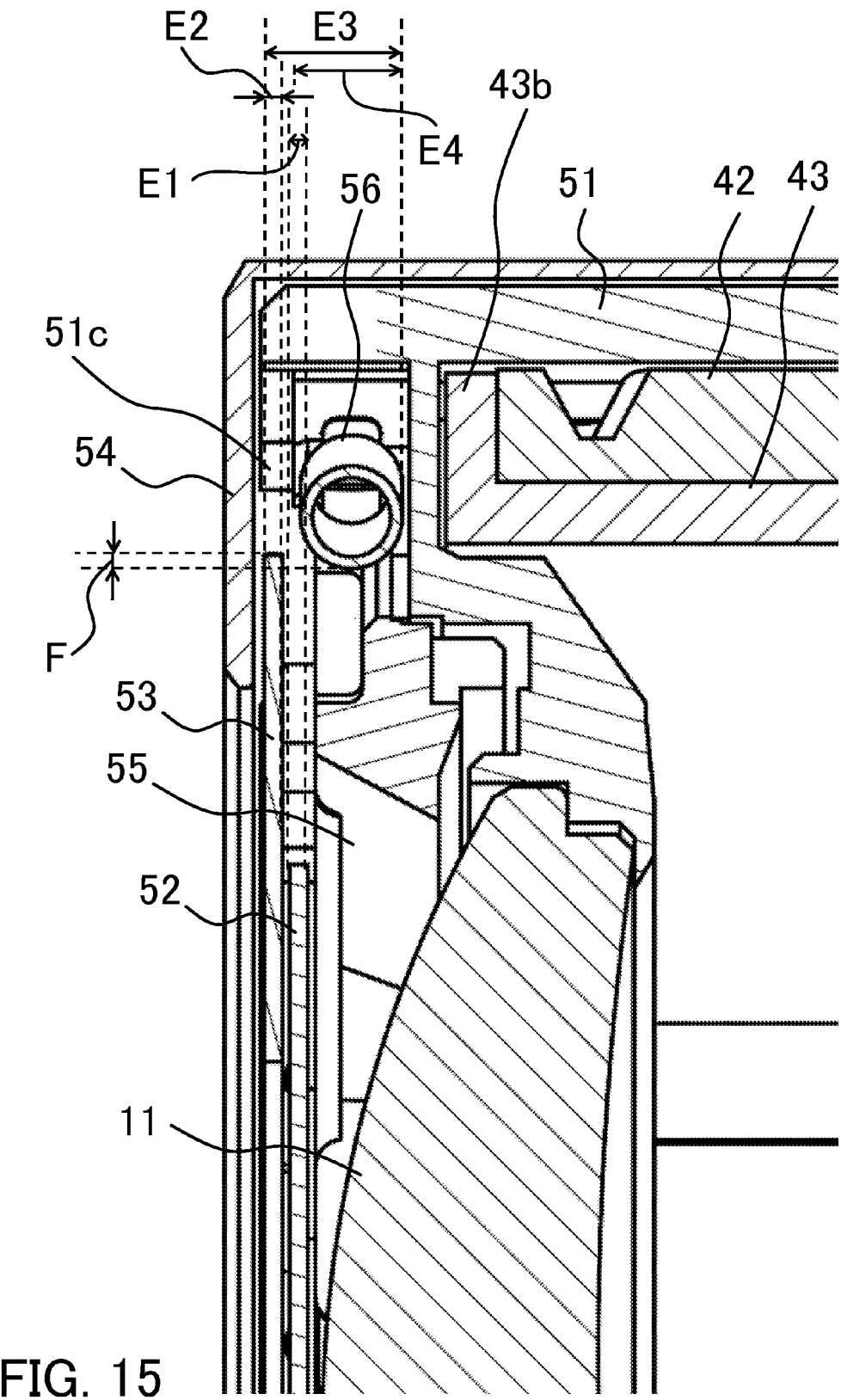
FIG. 15 is a cross-sectional view of the barrier apparatus (first cylinder unit) in the embodiment.

Next, referring to FIGS. 10 to 15, the operation of the barrier apparatus (barrier mechanism) in the embodiment will be described. FIGS. 10 to 12 are front views of the barrier apparatus (barrier mechanism) that is provided on the first cylinder unit 50. FIGS. 10 to 12 illustrate a barrier open state, a barrier closed state, and a state of transferring from the barrier closed state to the barrier open state, respectively. In FIGS. 10 to 12, the first cap 54 is omitted. FIG. 13 is a perspective view of the first cylinder unit 50, and the second straight moving cylinder 43 that performs the barrier operation. FIG. 14 is an A-A cross-sectional view in FIG. 11. FIG. 15 is a B-B cross-sectional view in FIG. 11.

As illustrated in FIGS. 10 to 13, in the barrier apparatus (barrier mechanism), the barrier drive ring 55 is configured to be rotatable around the optical axis by the engagement of the slope portion 43e of the second straight moving cylinder 43 and the drive section 55d of the barrier drive ring 55. In the barrier opening operation, the barrier drive ring 55 rotates in a clockwise direction in FIG. 11. In this case, the barrier blade 52 rotates around the shaft 51b of the first cylinder 51 while the blade drive portion 55a of the barrier drive ring 55 contacts the engaging portion 52c of the barrier blade 52. When the barrier closed state of FIG. 11 is transferred to the state of FIG. 12, the slide surface 52f at the outline end portion of the barrier blade 52 contacts the engaging portion 53c of the barrier blade 53. When the barrier blade 52 further rotates in the open direction from this state, both the barrier blades 52 and 53 rotate in the open direction.

On the other hand, in the barrier closing operation, first, the barrier blade 52 rotates in a barrier close direction and the engaging portion 52d at the end portion of the barrier blade 52 engages with the engaging portion 53b at the end of the barrier blade 53. Then, both the barrier blades 52 and 53 rotate in the barrier close direction. As described above, in the barrier apparatus in which a plurality of blades are arranged to overlap with each other in the optical axis direction, the barrier apparatus is configured such that the overlapped blade operates in conjunction with the operation of the blade disposed at a side closer to the lens.

In FIG. 11, each of a locus C1 (end locus) of the barrier blade 52 and a locus C2 (end locus) of the barrier blade 53 is illustrated. In the configuration of the barrier mechanism of the embodiment, when viewed from the front in FIG. 11, the locus C1 of the barrier blade 52 disposed at the side closer to the first lens unit 11 is out of a working region of the spring 56 and the locus C2 of the barrier blade 53 that is overlapped at the object side of the barrier blade 52 is inside the working region of the spring 56. The details of this state will be described with reference to FIG. 15 that is a B-B cross-sectional view in FIG. 11.

In FIG. 15, E1 indicates an opening and closing drive region of a shield portion of the barrier blade 52, and is substantially equal to a thickness of the barrier blade 52 in the optical axis direction. E2 indicates an opening and closing drive region of a shield portion of the barrier blade 53, and is substantially equal to a thickness of the barrier blade 53 in the optical axis direction. In the embodiment, the opening and closing drive region E1 that is a traveling space of the barrier blade 52 is provided at a position which is overlapped with the spring 56 in the optical axis direction. The opening and closing drive region E2 that is a traveling space of the barrier blade 53 which is overlapped at the object side is not overlapped with the spring 56 in the optical axis direction. Therefore, when the barrier blades 52 and 53 are disposed to overlap with the spring 56 in the optical axis direction, the opening and closing drive region E1 that is the traveling space of the barrier blade 52 and part of the spring 56 overlap with each other in the optical axis direction.

Normally, a sum of thicknesses of the two blades and the external outline of the spring is a thickness of the component parts. On the other hand, in the embodiment, a sum of the thickness (E2) of one blade and a width (E4) of the external outline of the spring (or a thickness which is substantially equal to the thickness (E2+E4)) corresponds to a thickness (distance E3 in FIG. 15) of the component parts (the barrier blades 52 and 53, and the spring 56) in the optical axis direction. Accordingly, the thickness in the optical axis direction of the barrier apparatus including the barrier blades 52 and 53 can be reduced.

As illustrated in FIG. 11, the locus C2 of the barrier blade 53 shares part of the spring 56 (region F in FIG. 15) when projected in the optical axis direction. As a result, a barrier shielding region of the barrier blade 53 in a plane orthogonal to the optical axis direction (orthogonal plane of the optical axis) can be increased.

As described above, in the configuration of the embodiment, while the barrier blades are arranged to overlap with each other in the optical axis direction, the thickness (total thickness) can be reduced. Furthermore, the barrier blade which is not overlapped with the spring in the plane orthogonal to the optical axis is disposed to overlap at the object side of the spring, and thus the barrier shielding region can be increased. In the embodiment, the spring 56 is disposed between a bottom portion 51*d* and the bayonet portion 51*c* of the first cylinder 51. As a result, the spring 56 can be efficiently disposed in the plane orthogonal to the optical axis.

FIG. 14 that is an A-A cross-sectional view in FIG. 11 illustrates the configuration in which the barrier blades 52 and 53 are disposed to overlap with each other in the optical axis direction in detail. When the barrier blades 52 and 53 are disposed to overlap with each other in the optical axis direction, especially, the barrier blade 53 that is provided at the position closest to the object side is located at a position farthest from the component parts at the lens side (the first lens unit 11 and the barrier drive ring 55) because of the configuration in which the blades overlap with each other. Therefore, in the barrier close state, a gap for the traveling space of the other barrier blade is provided between the barrier blade 53 provided at the position closest to the object side and the component parts at the lens side (at the side of the first lens unit 11). In particular, there is no receiving member in the component parts at the lens side in the region where this gap is provided (region G in FIG. 14). Therefore, when for example an external force P is applied to the region 53*d* of the barrier blade 53, the barrier blade 53 may be deformed in some cases. Especially, when the barrier blade 53 is made of metal, there is a possibility that the operation of the barrier opening and closing mechanism is affected by the plastic deformation of the barrier blade 53.

Therefore, the barrier blade 53 of the embodiment is configured such that the end of the engaging portion 53*c* of the barrier blade 53 comes close to the convex-shaped slide portion 55*e* of the barrier drive ring 55 in the barrier close state. In this configuration, even when the external force P is applied to the region 53*d* of the barrier blade 53, the displacement of the barrier blade 53 can be reduced since the end of the engaging portion 53*c* of the barrier blade 53 contacts the convex-shaped slide portion 55*e* of the barrier drive ring 55. Accordingly, the deformation of the barrier blade 53 can be avoided. In the embodiment, since the end of the engaging portion 53*c* of the barrier blade 53 comes close to the convex-shaped slide portion 55*e* of the barrier drive ring 55, it is not necessary to increase the length of the engaging portion 53*c* more than necessary. In the embodiment, the barrier mechanism which is configured by overlapping two barrier blades in the optical axis direction is described, and similarly the embodiment can be applied also to a barrier mechanism which is configured by overlapping three or more barrier blades.

Figure 18A:
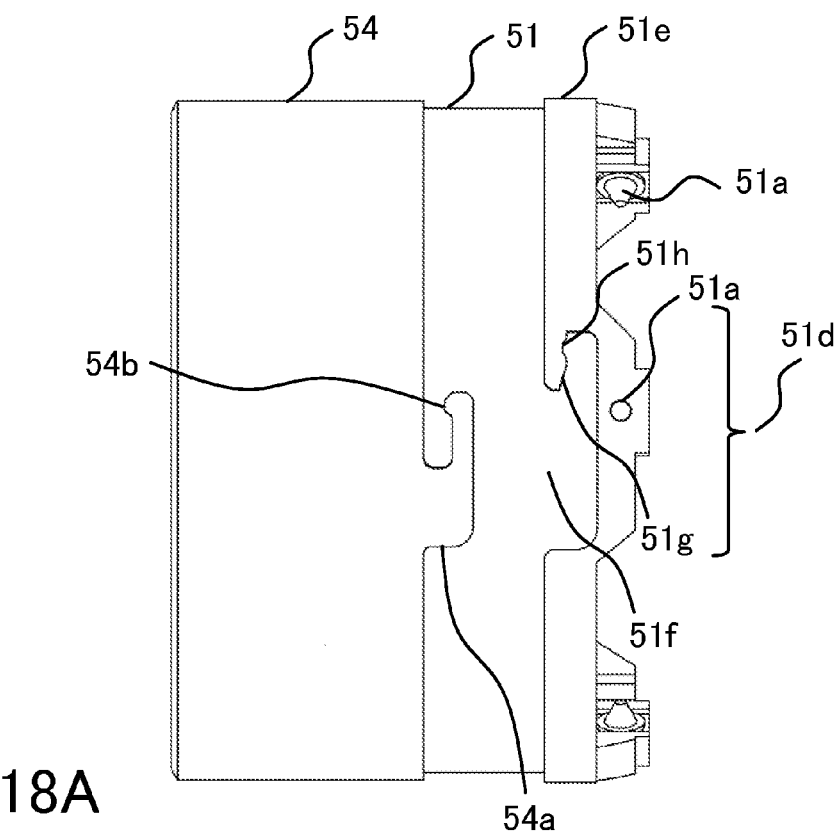
FIGS. 18A to 18C are side views of the barrier apparatus (first cap and first cylinder) in the embodiment.
Figure 18B:
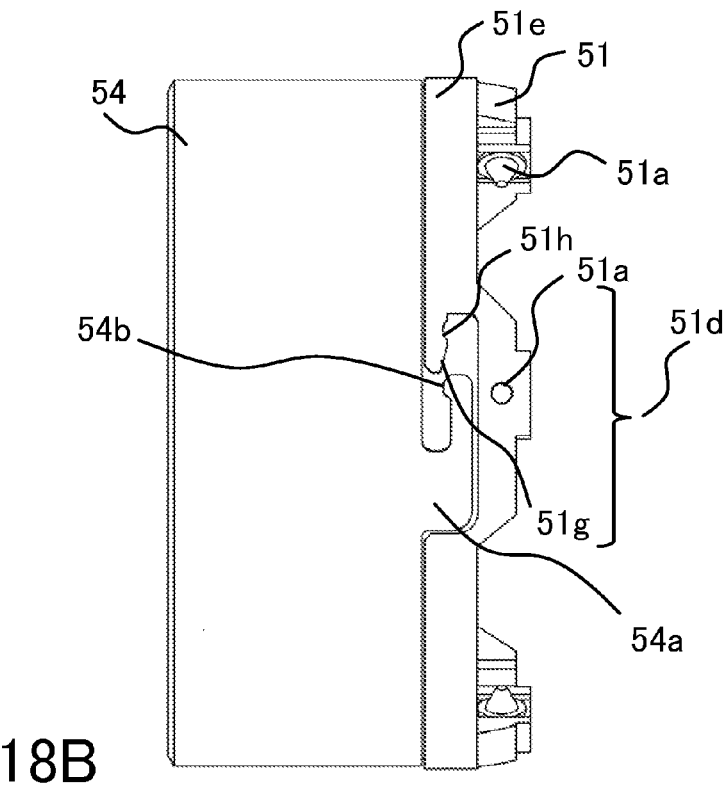
Figure 18C:
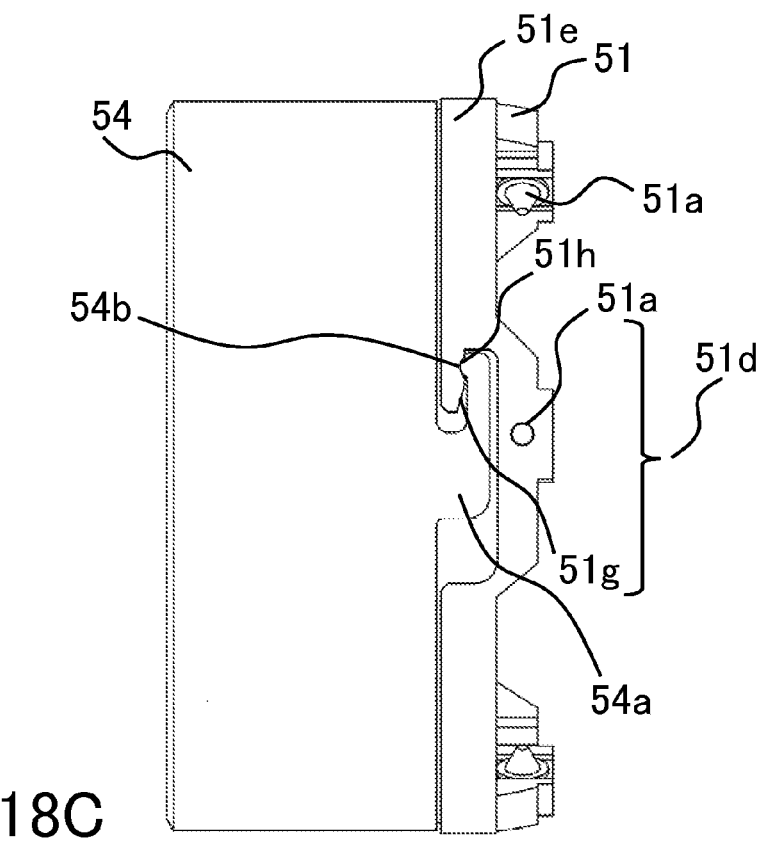

Subsequently, referring to FIGS. 18A to 18C, the engagement between the first cap 54 and the first cylinder 51 will be described. FIGS. 18A to 18C are side views of the first cap 54 and the first cylinder 51. FIGS. 18A and 18B illustrate states of the process in which the first cap 54 is being attached to the first cylinder 51. FIG. 18C illustrates a state (attachment completed state) in which the first cap 54 has been attached to the first cylinder 51.

The first cylinder 51 is provided with three cam pins 51*a* at an overhanging portion 51*d* that protrude to a back end of the first cylinder 51. The reason of providing the cam pins 51*a* at the overhanging portion 51*d* that protrude to the back side as described above is because, in the retracted state, the cam pin 51*a* and the cam pin 42*b* of the second cam cylinder 42 are disposed on the same plane each other in the plane orthogonal to the optical axis to reduce the size of the lens barrel 1.

In addition, the first cylinder 51 is provided with a circumferential convex portion 51*e* that achieves a spigot joint configuration along with an inner diameter of the cover cylinder 41. Since the convex portion 51*e* is set to be close to the inner diameter of the cover cylinder 41, the intrusion (leakage) of ray into the inside of the lens barrel 1 from a gap between the cover cylinder 41 and the first cylinder 51 can be prevented. It is important to provide the convex portion 51*e* continuously (seamlessly) in an entire circumference on the first cylinder 51 around the optical axis to keep alight blocking effect of the lens barrel 1, and for example, there is a possibility that the ray is intruded (leaked) into the inside of the lens barrel 1 from a cutout portion if part of the convex portion 51*e* is cut out. In the embodiment, an introduction portion 51*f* into which a locking claw 54*a* of the first cap 54 is inserted has at least partially a concave shape for the convex portion 51*e*. However, since the introduction portion 51*f* is provided at a region where the overhanging portion 51*d* is disposed, the convex portion 51*e* is configured to join continuously (seamlessly) in an entire circumference.

A pressing portion 54*b* is formed at an end of the locking claw 54*a* of the first cap 54. When the first cap 54 is rotated in a counterclockwise direction from the state of FIG. 18B, the first cap 54 (locking claw 54*a*) is bowed in the optical axis direction while the pressing portion 54*b* contacts a slope surface 51*g*. When the first cap 54 is further rotated, as illustrated in FIG. 18C, the pressing portion 54*b* is fitted into a concave portion 51*h* to hold the first cap 54. As a result, the pressing portion 54*b* is held in a pressed state by the concave portion 51*h*. In this time, a position of the first cap 54 with respect to the first cylinder 51 is determined by the contact between an end portion of the first cap 54 and an end portion of the first cylinder 51. The locking claw 54*a* is bowed and pressed by the concave portion 51*h*. Thus, since the locking claw 54*a* is bowed to be in the pressed state, the position of the first cap 54 with respect to the first cylinder 51 is determined without backlash. Therefore, for example, the traveling space of the blade of the barrier mechanism that is provided at the end of the first cylinder 51 is not changed by backlash and thus a stable operation of the barrier mechanism can be achieved.

In the state of FIG. 18C in which the first cap 54 is attached to the first cylinder 51, the pressing portion 54*b* of the locking claw 54*a* prevents the first cap 54 from being removed from the first cylinder 51 and thus the first cap 54 does not easily fall off even when an external force that is to remove the first cap 54 is applied in the optical axis direction. Furthermore, even when the external force that is to remove the first cap 54 is applied in a rotational direction, the pressing portion 54*b* of the locking claw 54*a* is pressed with an appropriate force against the concave portion 51*h* and thus the first cap 54 does not easily fall off. In the embodiment, the introduction portion 51*f* into which the locking claw 54*a* is inserted is provided in a region of disposing the overhanging portion 51*d*. Therefore, when the locking claw 54*a* is provided, it is not necessary to shorten the exterior surface and thus the configuration does not become an obstacle to reduce the size.

Figure 19:
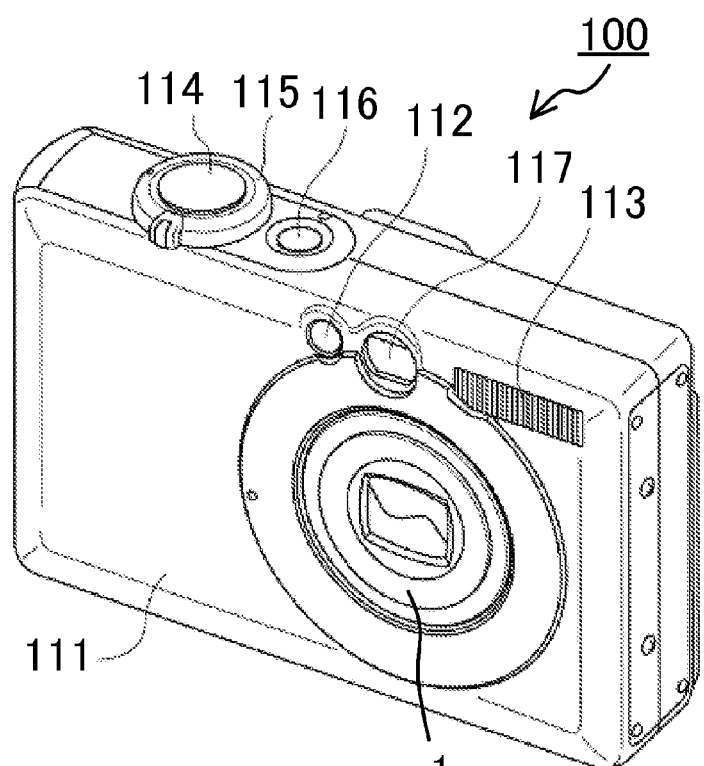
FIG. 19 is an external perspective view of an image pickup apparatus in the embodiment.

Next, referring to FIG. 19, an outline of an image pickup apparatus including the lens barrel 1 in the embodiment will be described. FIG. 19 is an external perspective view of an image pickup apparatus 100 (digital camera) in the embodiment. As illustrated in FIG. 19, the image pickup apparatus 100 includes an image pickup apparatus body 111 and the lens barrel 1 attached to the image pickup apparatus body 111. At a front surface of the image pickup apparatus 100, a finder objective lens 117 that determines a composition of an object, an auxiliary lighting unit 112 that performs an auxiliary operation of a light source in photometry or focus detection, a strobe 113, and the lens barrel 1 (lens apparatus) are provided. At an upper surface of the image pickup apparatus body 111, a release button 114, a zoom switching button 115, and a power switching button 116 are provided. In the embodiment, the lens barrel 1 is configured to be movable between in a retracted state and in an extended state (image capturing state).

In the embodiment, the spring 56 (biasing member) is disposed in the direction orthogonal to the optical axis with respect to the barrier blade 52. Furthermore, the spring 56 is disposed so as to overlap with at least part of the barrier blade 53 in the optical axis direction during an opening and closing operation of the barrier blade 53.

Preferably, the barrier blade 52 and the spring 56 are disposed on the same plane that is orthogonal to the optical axis (on the orthogonal plane of the optical axis). Preferably, the locus C1 (first locus) that is depicted by the opening and closing operation of the barrier blade 52 does not overlap with the spring 56 in the optical axis direction. Preferably, at least part of the locus C2 (second locus) that is depicted by the opening and closing operation of the barrier blade 53 overlaps with the spring 56 in the optical axis direction. Preferably, the distance (E3) in the optical axis direction between the position closest to the object side of the barrier blade 53 and the position closest to the imaging plane of the spring 56 is smaller than a sum of the thickness (E1) of the barrier blade 52, the thickness (E2) of the barrier blade 53, and the thickness (E4) of the spring 56 in the optical axis direction. In other words, the relation of E3<E1+E2+E4 is satisfied.

Preferably, the lens barrel 1 includes the second straight moving cylinder 43 (straight moving member) that performs a straight regulation of the first cylinder 51 (holding member) holding the barrier blades 52 and 53 and the barrier drive ring 55. The spring 56 is disposed so as to overlap with at least part of the second straight moving cylinder 43 in the optical axis direction. More preferably, the first cylinder 51 includes the bayonet portion 51c (position regulating member) that regulates the position of the barrier drive ring 55 in the optical axis direction. The spring 56 is disposed so as to overlap with at least part of the bayonet portion 51c in the optical axis direction.

According to the embodiment, a barrier blade and its biasing member are efficiently disposed to achieve a small-sized barrier mechanism. Therefore, according to the embodiment, a lens barrel and an image pickup apparatus including a small-sized barrier mechanism can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-247829, filed on Nov. 29, 2013, which is hereby incorporated by reference herein in its entirety.

What is claimed is:
1. A lens barrel comprising:
a first blade member;
a second blade member provided at an object side of the first blade member and overlapped with at least part of the first blade member in an optical axis direction;
a drive unit configured to perform an opening and closing drive of the first blade member and the second blade member; and
a biasing member configured to apply a biasing force to the drive unit,
wherein the biasing member is disposed in a direction orthogonal to an optical axis with respect to the first blade member, and
wherein the biasing member is disposed so as to overlap with at least part of the second blade member in the optical axis direction during an opening and closing operation of the second blade member.
2. The lens barrel according to claim 1, wherein the first blade member and the biasing member are disposed on the same plane that is orthogonal to the optical axis.
3. The lens barrel according to claim 1, wherein a first locus that is depicted by the opening and closing operation of the first blade member does not overlap with the biasing member in the optical axis direction.
4. The lens barrel according to claim 1,
wherein at least part of a second locus that is depicted by the opening and closing operation of the second blade member overlaps with the biasing member in the optical axis direction.
5. The lens barrel according to claim 1,
wherein a distance between a position closest to the object side of the second blade member and a position closest to an imaging plane side of the biasing member in the optical axis direction is smaller than a sum of a thickness of the first blade member, a thickness of the second blade member, and a thickness of the biasing member.
6. The lens barrel according to claim 1, further comprising a straight moving member configured to perform a straight moving regulation of a holding member that holds the first blade member, the second blade member, and the drive unit,
wherein the biasing member is disposed so as to overlap with at least part of the straight moving member in the optical axis direction.
7. The lens barrel according to claim 6,
wherein the holding member includes a position regulating member that regulates a position of the drive unit in the optical axis direction, and
wherein the biasing member is disposed so as to overlap with at least part of the position regulating member in the optical axis direction.
8. The lens barrel according to claim 1,
wherein the biasing member is provided between the first blade member and the drive unit and is configured to apply the biasing force to keep the first blade member in an open state.
9. The lens barrel according to claim 1,
wherein the biasing member is a coil spring.
10. An image pickup apparatus comprising:
an image pickup element; and
a lens barrel,
wherein the lens barrel includes:
a first blade member;

a second blade member provided at an object side of the first blade member and overlapped with at least part of the first blade member in an optical axis direction;

a drive unit configured to perform an opening and closing drive of the first blade member and the second blade member; and a biasing member configured to apply a biasing force to the drive unit, wherein the biasing member is disposed in a direction orthogonal to an optical axis with respect to the first blade member, and wherein the biasing member is disposed so as to overlap with at least part of the second blade member in the optical axis direction during an opening and closing operation of the second blade member.

* * * * *